United States Patent
Krieger et al.

(10) Patent No.: US 9,386,010 B2
(45) Date of Patent: Jul. 5, 2016

(54) ABSTRACTED AUTHENTICATED CLIENT CONNECTIVITY APPLICATION PROGRAMMING INTERFACE (API)

(71) Applicant: GLOBALFOUNDRIES Inc., Grand Cayman (KY)

(72) Inventors: Caspar G. J. Krieger, Wembley (AU); Billy Joe Soper, Busselton (AU); Kenichi Yoshimura, Subiaco (AU)

(73) Assignee: GLOBALFOUNDRIES INC., Grand Cayman (KY)

( * ) Notice: Subject to any disclaimer, the term of this patent is extended or adjusted under 35 U.S.C. 154(b) by 326 days.

(21) Appl. No.: 13/875,827

(22) Filed: May 2, 2013

(65) Prior Publication Data
US 2014/0331292 A1  Nov. 6, 2014

(51) Int. Cl.
H04L 29/06 (2006.01)

(52) U.S. Cl.
CPC ............. *H04L 63/083* (2013.01); *H04L 63/166* (2013.01)

(58) Field of Classification Search
CPC ....... H04L 63/08; H04L 63/083; H04L 29/06; H04L 29/0653; H04L 63/166; H04L 67/2823; H04L 67/306; H04L 69/329; G06F 17/30905
USPC .......... 726/2–7; 709/202, 203, 228, 229, 230, 709/237, 250; 713/152, 168
See application file for complete search history.

(56) References Cited

U.S. PATENT DOCUMENTS

| | | | | |
|---|---|---|---|---|
| 6,826,696 | B1* | 11/2004 | Chawla | H04L 63/0815 713/168 |
| 6,954,792 | B2* | 10/2005 | Kang | H04L 63/10 709/203 |
| 8,190,675 | B2 | 5/2012 | Tribbett | |
| 8,280,955 | B1* | 10/2012 | Tyagi | H04L 67/2814 370/329 |
| 2002/0010917 | A1* | 1/2002 | Srikantan | H04L 29/06 725/1 |
| 2002/0191604 | A1* | 12/2002 | Mitchell | H04L 9/3271 370/389 |

(Continued)

OTHER PUBLICATIONS

"Connection Handler API", muhler, github.com, 2011.*

(Continued)

*Primary Examiner* — Shanto M Abedin
(74) *Attorney, Agent, or Firm* — David Cain; Andrew M. Calderon; Roberts, Mlotkowski, Safran & Cole P.C.

(57) ABSTRACT

A request to establish a connection to a server application executed by a server device is received at a client-side authenticated-connection application programming interface (API) from a client application executed by a client device. The connection request is sent from the client device to a server-side authenticated-connection API executed by the server device. The connection request includes user identification information usable to authenticate a user of the client application with the server-side authenticated-connection API to access the server application. A connection establishment acknowledgement is received from the server-side authenticated-connection API. A handler that represents an established connection to the server application is returned to the client application as a connection establishment acknowledgement. The client application is configured to communicate with the server application using the handler over the established connection with the separate application-specific read/write API.

17 Claims, 4 Drawing Sheets

(56) References Cited

U.S. PATENT DOCUMENTS

| | | | |
|---|---|---|---|
| 2003/0005117 A1* | 1/2003 | Kang | H04L 63/10 709/225 |
| 2005/0033802 A1* | 2/2005 | Pauly | H04L 67/42 709/203 |
| 2005/0238034 A1* | 10/2005 | Gillespie et al. | 370/401 |
| 2005/0257099 A1* | 11/2005 | Bounkong | G06T 1/005 714/48 |
| 2008/0148402 A1* | 6/2008 | Bogineni | H04L 63/0428 726/22 |
| 2008/0177829 A1* | 7/2008 | Banerjee et al. | 709/203 |
| 2008/0301784 A1* | 12/2008 | Zhu et al. | 726/5 |
| 2008/0307219 A1* | 12/2008 | Karandikar | H04L 63/166 726/12 |
| 2009/0013399 A1* | 1/2009 | Cottrell | H04L 63/0421 726/12 |
| 2009/0064208 A1* | 3/2009 | Elrod | H04L 63/166 719/330 |
| 2010/0146291 A1* | 6/2010 | Anbuselvan | H04L 63/08 713/189 |
| 2010/0188975 A1* | 7/2010 | Raleigh | G06Q 10/06375 370/230.1 |
| 2011/0106882 A1 | 5/2011 | Takakura et al. | |
| 2011/0184993 A1* | 7/2011 | Chawla | G06F 17/30194 707/802 |
| 2012/0005477 A1* | 1/2012 | Wei | H04L 63/0272 713/153 |
| 2013/0324260 A1* | 12/2013 | McCaffrey | A63F 13/12 463/42 |

OTHER PUBLICATIONS

"Realization and Performance Analysis of a SOAP Server for Mobile Devices", Linh Pham et al, Wireless Conference, 2005.*

* cited by examiner

ABSTRACTED AUTHENTICATED CLIENT CONNECTIVITY APPLICATION PROGRAMMING INTERFACE (API)

BACKGROUND

The present invention relates to client application connectivity. More particularly, the present invention relates to an abstracted authenticated client connectivity application programming interface (API).

Client applications may communicate with remote server applications. The client applications and remote server applications may be executed by client computing devices and server computing devices, respectively. Client applications may request services provided by the remote server applications, and the remote server applications may provide the requested services to the requesting client applications. As such, client applications may be configured to utilize functionality located on remote servers without having to be programmed to provide all of the functionality utilized by the respective client applications.

BRIEF SUMMARY

A method includes receiving, at a client-side authenticated-connection application programming interface (API) executed by a processor of a client device, a request from a client application to establish a connection to a server application executed by a server device; sending, on behalf of the client application, the connection request to a server-side authenticated-connection API executed by the server device that hosts the server application, where the connection request comprises user identification information usable to authenticate a user of the client application with the server-side authenticated-connection API to access the server application; receiving a connection establishment acknowledgement from the server-side authenticated-connection API; and returning a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API.

A system includes a communication interface and a processor programmed to: receive, at a client-side authenticated-connection application programming interface (API) executed by a processor of a client device, a request from a client application to establish a connection to a server application executed by a server device; send, on behalf of the client application via the communication interface, the connection request to a server-side authenticated-connection API executed by the server device that hosts the server application, where the connection request comprises user identification information usable to authenticate a user of the client application with the server-side authenticated-connection API to access the server application; receive a connection establishment acknowledgement from the server-side authenticated-connection API via the communication interface; and return a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API.

A computer program product includes a computer readable storage medium having computer readable program code embodied therewith, where the computer readable program code when executed on a computer causes the computer to: receive, at a client-side authenticated-connection application programming interface (API) executed by a processor of a client device, a request from a client application to establish a connection to a server application executed by a server device; send, on behalf of the client application, the connection request to a server-side authenticated-connection API executed by the server device that hosts the server application, where the connection request comprises user identification information usable to authenticate a user of the client application with the server-side authenticated-connection API to access the server application; receive a connection establishment acknowledgement from the server-side authenticated-connection API; and return a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API.

DETAILED DESCRIPTION

Figure 1:
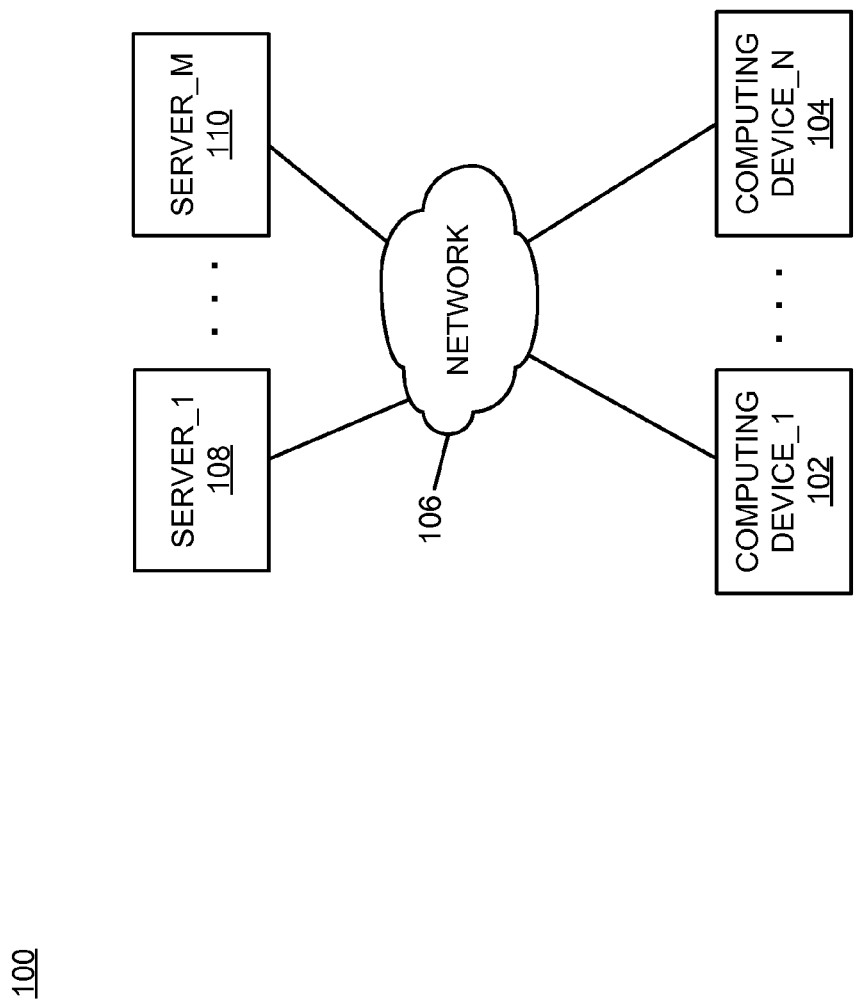
FIG. 1 is a block diagram of an example of an implementation of a system for implementation of an abstracted authenticated client connectivity application programming interface (API) according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides an abstracted authenticated client connectivity application programming interface (API). The abstracted authenticated client connectivity API provides a unified interface usable by client applications to request connections with servers and server applications. In response to the connection request from a client application, the abstracted authenticated client connectivity API of a client device operates as a proxy for the client application and communicates with another complementary implementation of the abstracted authenticated client connectivity API of the server device to establish the requested connection and authenticate the user on behalf of the requesting client application. Communications may be established using a secure socket layer (SSL) or otherwise, as designated by the abstracted authenticated client connectivity API of the server device. In response to establishment of the connection, the abstracted authenticated client connectivity API of the client device returns a handler to the client application that represents the connection to the requested server application executed by the server device. The respective applications communicate using a separate application-specific read/write API.

As such, development of client applications and server applications may be reduced in complexity by encapsulation of the communication-level programming from the respective application-level operations. Further, any changes to communication-level technologies may be isolated from application-level software maintenance activities.

It should be noted that the handler returned to the client application also represents an indication that communication with the server application using the handler over the established connection via the separate application-specific read/write API is available. As such, a caller (e.g., client application) of the abstracted authenticated client connectivity API and the server that provides a requested service (e.g., server application) are provided with a handler that represents and describes a status of communication between the server and the client devices. Using the handler, the respective applications may read and write data between the client and server devices using the application-specific read/write API. As such, communications between applications may be encoded as appropriate for the respective implementation without being limited by communication-level task and operation encoding.

It should be noted that conception of the present subject matter resulted from recognition of certain limitations associated with connectivity to remote servers and remote server applications by client devices and client applications. It was observed that a conventional client/server implementation over a transmission control protocol/Internet protocol (TCP/IP) network involves development and usage of several application programming interfaces (APIs) for client and server applications that each separately support different aspects of communication. For example, one API may be used for establishment of a communication channel. A second API may be used for securing a communication channel. A third API may be used for user authentication. And a fourth API may be used for invocation of a suitable server application program to handle client application requests. It was determined based upon these observations that client and server application developers were required to design, implement, and maintain the respective applications to utilize each of these different APIs, and that the programming requirements for so many different APIs increased client and server application development costs and reduced application programmer efficiency. The programming interface described herein abstracts the tasks performed by different APIs into an abstracted authenticated client connectivity API to reduce the complexity of programming interface design and maintenance. As such, the present technology may improve application programmer efficiency, and as such, may reduce client and server application development and maintenance costs.

The present subject matter improves connectivity to remote servers and remote server applications by client devices and client applications by providing an abstracted authenticated client connectivity application programming interface (API), as described above and in more detail below. As such, improved client and server application development and maintainability may be obtained through use of the present technology.

The abstracted authenticated client connectivity application programming interface (API) described herein may be provided in real time to allow prompt API connectivity and authentication for client applications. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for implementation of an abstracted authenticated client connectivity application programming interface (API). A computing device_1 102 through a computing device_N 104 may communicate via a network 106 with a server_1 108 through a server_M 110.

As will be described in more detail below in association with FIG. 2 through FIG. 4, the computing device_1 102 through the computing device_N 104 and the server_1 108 through the server_M 110 may each provide the abstracted authenticated client connectivity API. The abstracted authenticated client connectivity API is based upon abstracted processing of connection-related operations (e.g., establishment of a communication channel, securing of the communication channel, user authentication, client application requests, etc.) through the API described herein that interfaces with the respective devices for communications. As such, the present technology may be implemented at both a user computing device and a server device level, and the operations performed at the respective devices may be considered complementary operations. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Figure 2:
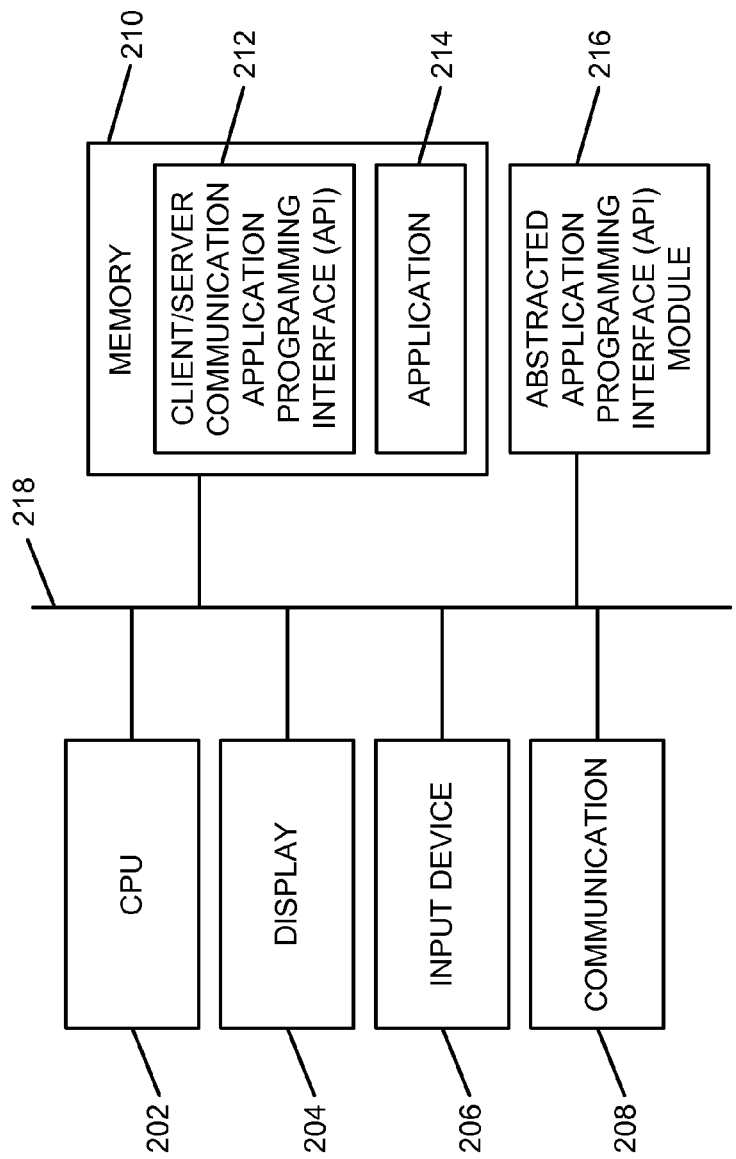
FIG. 2 is a block diagram of an example of an implementation of a core processing module capable of providing and utilizing an abstracted authenticated client connectivity application programming interface (API) according to an embodiment of the present subject matter.

FIG. 2 is a block diagram of an example of an implementation of a core processing module 200 capable of providing and utilizing an abstracted authenticated client connectivity application programming interface (API). The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of the abstracted authenticated client connectivity API in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a client/server communication application programming interface (API) processing and storage area 212 that stores API and connection configuration and processing information within the core processing module 200. As will be described in more detail below, the information stored within the client/server communication API storage area 212 is used to request abstracted connection processing by client applications when the core processing module 200 is implemented in association with the computing device_1 102 through the computing device_N 104. Similarly, the information stored within the client/server communication API storage area 212 is used to respond to and process requests for abstracted connection processing by client applications when the core processing module 200 is implemented in association with the server_1 108 through the server_M 110.

An application area 214 provides storage and execution space for one or more client-side applications executed in association with the computing device_1 102 through the computing device_N 104. Similarly, the application area 214 provides storage and execution space for one or more server-side applications executed in association with the server_1 108 through the server_M 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An abstracted application programming interface (API) module 216 is also illustrated. The abstracted API module 216 manages establishment of a communication channel, the securing of the communication channel, user authentication, client application requests, and other processing using an abstraction layer that separates the communication management from the client-side applications and server-side applications, respectively. The abstracted API module 216 implements the abstracted authenticated client connectivity API of the core processing module 200. It should be noted that the abstracted authenticated client connectivity API may be implemented as a service provided by server applications to client applications. As such, the abstracted authenticated client connectivity API may have complementary functionality when the core processing module 200 is implemented on a server device and a client device, respectively.

It should also be noted that the abstracted API module 216 may form a portion of other circuitry described without departure from the scope of the present subject matter. Further, the abstracted API module 216 may alternatively be implemented as an application stored within the memory 210. In such an implementation, the abstracted API module 216 may include instructions executed by the CPU 202 for performing the functionality described herein. The CPU 202 may execute these instructions to provide the processing capabilities described above and in more detail below for the core processing module 200. The abstracted API module 216 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the abstracted API module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
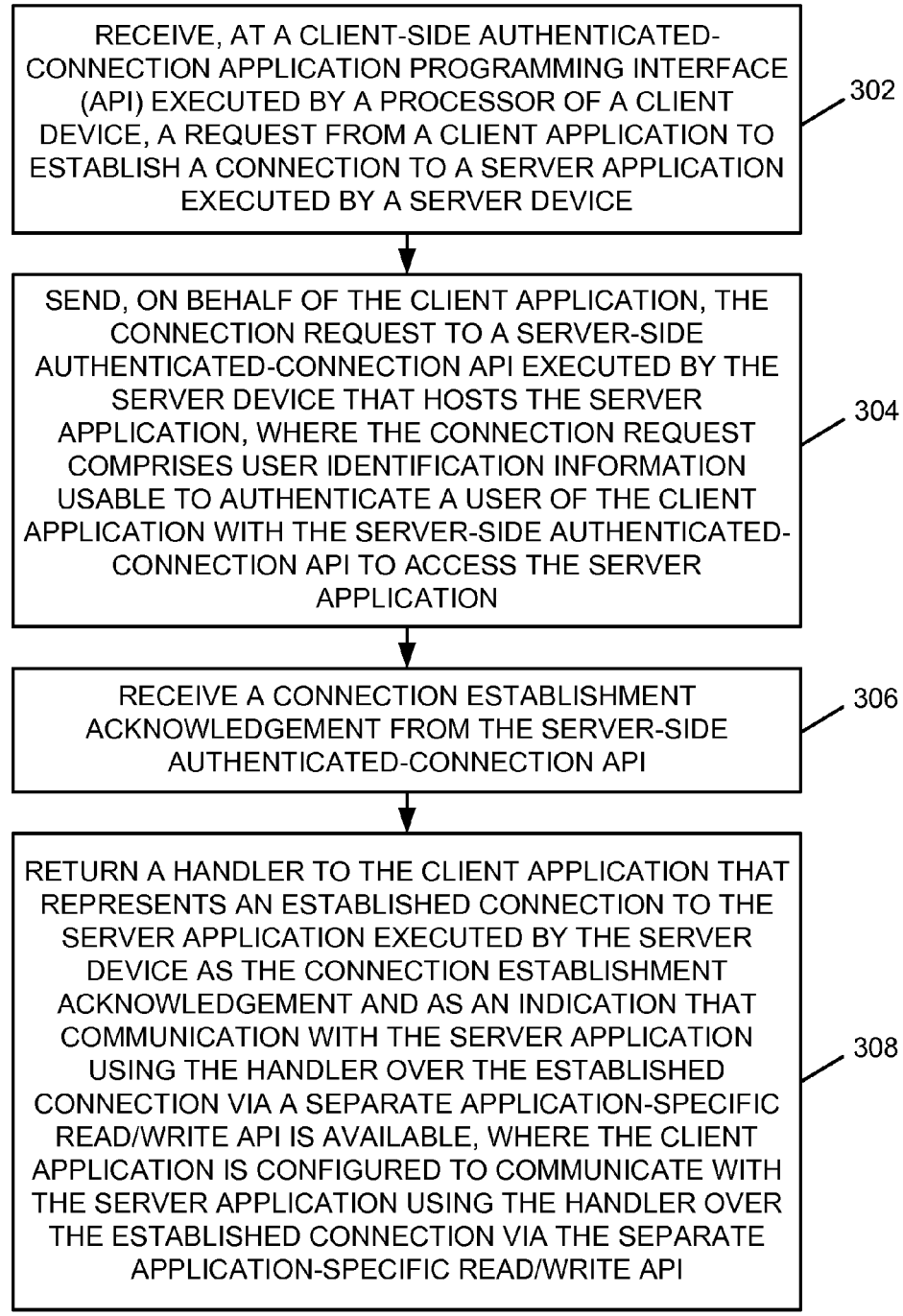
FIG. 3 is a flow chart of an example of an implementation of a process for providing an abstracted authenticated client connectivity application programming interface (API) according to an embodiment of the present subject matter.
Figure 4:
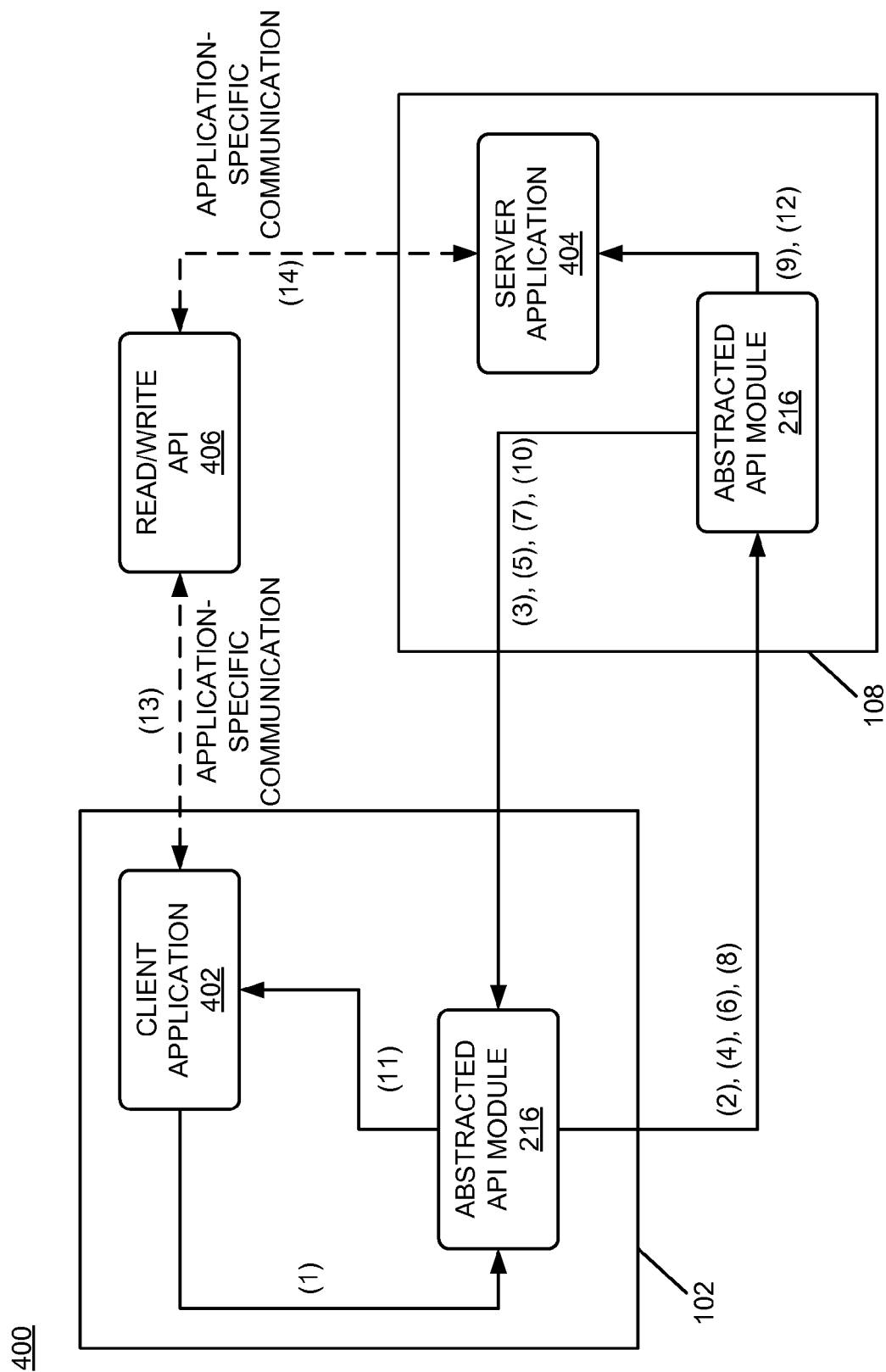
FIG. 4 is a flow diagram of an example of an implementation of an abstracted authenticated client connectivity application programming interface (API) process between a client device and a server device according to an embodiment of the present subject matter.

FIG. 3 through FIG. 4 described below represent example processes that may be executed by devices, such as the core processing module 200, to implement the abstracted authenticated client connectivity API associated with the present subject matter. Many other variations on the example processes are possible and all are considered within the scope of the present subject matter. The example processes may be performed by modules, such as the abstracted API module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for providing an abstracted authenticated client connectivity application programming interface (API). At block 302, the process 300 receives, at a client-side authenticated-connection application programming interface (API) executed by a processor of a client device, a request from a client application to establish a connection to a server application executed by a server device. At block 304, the process 300 sends, on behalf of the client application, the connection request to a server-side authenticated-connection API executed by the server device that hosts the server application, where the connection request comprises user identification information usable to authenticate a user of the client application with the server-side authenticated-connection API to access the server application. At block 306, the process 300 receives a connection establishment acknowledgement from the server-side authenticated-connection API. At block 308, the process 300 returns a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API.

FIG. 4 is a flow diagram of an example of an implementation of an abstracted authenticated client connectivity application programming interface (API) process 400 between a client device and a server device. As described below, the process 400 represents activities performed by both a client-side authenticated-connection API and a server-side authenticated-connection API. For purposes of the present examples, the abstracted API module 216 executed by the client device_1 102 represents the client-side authenticated-connection API, and the abstracted API module 216 executed by the server_1 108 represents the server-side authenticated-connection API. As such, FIG. 4 represents two distinct processing flow diagrams, one for each of the respective client-side authenticated-connection API and the server-side authenticated-connection API.

The computing device_1 102 and the server_1 108 are illustrated for purposes of the present example. For purposes of the present example, a client application 402 executed by the computing device_1 102 seeks to access and utilize a server application 404 hosted by the server_1 108. The abstracted API module 216 is illustrated in association with the core processing module 200 (not shown) for each of the computing device_1 102 and the server_1 108. As described above and in more detail below, interaction between the respective abstracted API modules 216 facilitates an abstraction of communication-level processing that reduces connectivity management for both the client application 402 and the server application 404. As such, development and maintenance of both the client application 402 and the server application 404 may be improved by use of the present technology.

At operation (1), a request to establish a new connection is issued by the client application 402 to the abstracted API module 216. The request for the new connection may include a user identifier (ID), a user password, and a server application identifier (ID) that identifies the server application 404 that is requested by the client application 402 to be executed on the server_1 108 on behalf of the client application 402.

At operation (2), the abstracted API module 216 of the computing device_1 102 sends a connection request to the abstracted API module 216 of the server_1 108. The connection request sent to the abstracted API module 216 of the server_1 108 may include user identification information (e.g., the user ID and user password) usable to authenticate the user with the server_1 108 (via the API module 216 of the server_1 108) to access the server application 404. The connection request sent to the abstracted API module 216 of the server_1 108 may also include the server application ID that identifies the server application 404.

At operation (3), if the server_1 108 is capable of providing the new connection request (e.g., resource availability is currently capable of the additional processing represented by the request), then the abstracted API module 216 of the server_1 108 responds with an acknowledgment that indicates one of secure socket layer (SSL) or non-SSL communication is to be utilized for the connection. It should be noted that the abstracted API provided by the respective abstracted API modules 216 may stop with an error if resources are not presently available. As such, SSL communications may be considered optional and may be utilized granularly per connection as appropriate for a given implementation.

At operation (4), if the abstracted API module 216 of the server_1 108 indicated that SSL communications are to be utilized for the requested communication, the abstracted API module 216 of the computing device_1 102 initiates an SSL handshake with the abstracted API module 216 of the server_1 108. It should be noted that where SSL communication is not indicated by the abstracted API module 216 of the server_1 108, the operation (4) may be omitted.

At operation (5), the abstracted API module 216 of the server_1 108 responds to the SSL handshake request (again if SSL communications are to be used). For an SSL implementation, if the SSL handshake completes successfully, the abstracted API continues processing to establish a connection. Otherwise, the abstracted API may return an error.

At operation (6), the abstracted API module 216 of the computing device_1 102 sends the user ID and user password received from the client application 402 to the abstracted API module 216 of the server_1 108 for authentication by the server_1 108. At operation (7), the abstracted API module 216 of the server_1 108 authenticates the user with the received user ID and user password. Again, the abstracted API continues if authentication of the requesting user is successful, or returns an error if the user is not authenticated to access the server application 404.

It should be noted that within the present example, the user ID and user password are presumed to have been properly authenticated, and the abstracted API continues with establishment of the connection. However, if the user password has expired, the abstracted API module 216 of the server_1 108 may initiate a process to allow the user to change the user password. This additional processing may be performed by communication with the abstracted API module 216 of the computing device_1 102, which may in turn communicate with the client application 402 (both not shown) to initiate a user password change.

At operation (8), the abstracted API module 216 of the computing device_1 102 requests execution of the server application 404 on the server_1 108 using the server application ID provided by the client application 402. At operation (9), the abstracted API module 216 of the server_1 108 creates a new process (e.g., thread) on the server_1 108 under user authorization and ownership of the client application 402 used by the user of the client application 402. In the newly created process/thread, the requested server application 404 is invoked to start application-level processing on the server_1 108.

At operation (10), if the previous operation (9) is successful and the server application 404 begins processing, the abstracted API module 216 of the server_1 108 sends an acknowledgement to the abstracted API module 216 of the computing device_1 102 indicating that invocation of requested server-side application is successful. At operation (11), the abstracted API module 216 of the computing device_1 102 returns a handler that represents a communication with the server application 404 and that is usable to interface with the server application 404. At operation (12), the abstracted API module 216 of the server_1 108 passes the handler to the invoked server application 404. AAA It should be noted that receipt of the handler by the client application 402 indicates to the client application 402 that the client/server communication has been established by the abstracted API module 216 of the computing device_1 102 and that the client/server communication is ready to be utilized. It should also be noted that receipt of the handler by the server application 404 indicates that the client/server communication is ready.

As such, in response to receiving the handler, the client application 402 may begin communications with the server application 404 using a read/write API 406 that facilitates an application-specific protocol/communication represented by the dashed arrows (13) and (14). The application-specific protocol/communication may be developed as appropriate for any given implementation.

As such, client applications may request connectivity using an abstracted authenticated client connectivity API without having to be programmed by developers to support underlying connection establishment and configuration processing. Server applications may also operate without having to be programmed by developers to support underlying connection establishment and configuration processing and without having to respond to such requests. The respective abstracted API modules 216 may be utilized by many client and server applications, thereby encapsulating any changes for communication-level aspects within the respective abstracted API modules 216. Accordingly, maintenance of client and server applications and of the abstracted API modules 216 may be improved by partitioning the respective functionality, and by abstracting the communication layer aspects from the application level programs.

The following first example pseudo syntax represents one possible implementation of the server-side extensions to interact via a client application with the abstracted authenticated client connectivity API described herein. It should be noted that many other possible encodings of the present subject matter are possible, and all such encodings are considered to be within the scope of the present technology. It should also be noted that at the time this routine is executed, the implementer of the extension may assume that user authentication has already been performed and that the program is running under the user's credential (e.g., the process is owned by the requester rather than the server). Further, several APIs are provided that deal with TCP/IP socket read and write. A first API is an IP server socket layer configuration (IPVSRVSL) API. The second API is an IP server send function (IPVSRVSF). The third API is an IP server receive function (IPVSRVRF). The implementer of this extension does not have to be concerned with SSL versus non-SSL communication because those APIs manage those aspects in an abstracted manner. As such, server application development and maintenance may be improved by use of the present technology.

```
int main(int argc, char * argv[ ]) {
  char*e;
  int i;
  int sent;
  int sendlen;
  int recvlen;
```

```
    int flags = 0;
    int fc1 = 1;
    int trace_detail = 2;
    char* recvbuf;
    char *samplebuf1 = "Hello socket from example m=1.";
    typedef int (*funcPtr)( );
    int srvslrc, sendrc, recvcount, payloadlength;
    int *paylenptr = &payloadlength;
    //Establish connectivity using abstracted API
    setupfunc = (funcPtr) fetch("IPVSRVSL");
    sendfunc = (funcPtr) fetch("IPVSRVSF");
    recvfunc = (funcPtr) fetch("IPVSRVRF");
    srvslrc = (*setupfunc)(&fc1, &ipvhandle, argv[1], &trace_detail);
    /* If svrslrc = 0 , comms all established */
    /* malloc a 50 byte area to receive msgs to */
    recvbuf = malloc(50);
    /* socket communication, may be implemented as appropriate for
    application */
    /* this example sends an integer first, then sends a message */
    payloadlength = strlen(samplebuf1);
    sendlen = sizeof(payloadlength);
    sendrc = (*sendfunc)(&ipvhandle, &sendlen, (char**) &paylenptr);
    sendlen = strlen(samplebuf1);
    sendrc = (*sendfunc)(&ipvhandle, &sendlen, &samplebuf1);
    /* Now receiving, similarly, get the first 4 bytes into an int */
    recvlen = 4;
    recvcount = (*recvfunc)(&ipvhandle, &recvlen, (char **) &paylenptr);
    /* and now the receive of the message for the length we just saw */
    recvlen = payloadlength;
    recvcount = (*recvfunc)(&ipvhandle, &recvlen, (char **) &recvbuf);
}
```

The following second example pseudo syntax represents one possible implementation of the client-side extensions to interact via a client application with the abstracted authenticated client connectivity API described herein. It should be noted that many other possible encodings of the present subject matter are possible, and all such encodings are considered to be within the scope of the present technology. It should additionally be noted that, for purposes of the present example, it may be seen that a request is made to an "EGSSL" extension on line nine (9) of the following second example pseudo syntax. This call to the "EGSSL" extension establishes a TCP/IP socket connection with a server, performs SSL initialization if appropriate, performs authentication with the server, spawns a new process/thread on the server, and invokes an extension (EGSSL) that maps to the sample extension within a second example pseudo syntax described further below for the server-side. As can also be seen from the second example pseudo syntax below, after the connection is established via the "EGSSL" extension processing, the requesting client application may read and write data using APIs provided by the framework. Within the present example, the provided APIs utilize a non-blocking socket input/output class (e.g., "NonBlockingSocketIO" class), as shown within the "receiveAndSend( )" function below within the second example pseudo syntax. As such, client application development and maintenance may be improved by use of the present technology.

```
public void run(IProgressMonitor monitor) throws
InvocationTargetException,
InterruptedException {
    try {
        // Retrieve a list of connections for PD Tools connection type.
        Collection<HostDetails> hosts =
        ConnectionUtilities.getSystemInformation( );
        // Pick the first connection for demo. Logic may be modified to
        // handle multiple connections scenarios.
        final HostDetails aHost = hosts.iterator( ).next( );
        // Establish a new connection to EGSSL extension of the server
        // via the abstracted API
        NonBlockingSocketIO nbsio =
        ConnectionUtilities.newConnection(aHost, "EGSSL", null, monitor);
        // Beginning of application specific logic. Example receives a
        // message and sends a message
        receiveAndSend(nbsio, monitor);
        nbsio.closeConnection( ); // Close the connection.
    } catch (Exception e) {
        throw new InvocationTargetException(e);
    }
}
// Function called above to receive and send using application-specific API
private void receiveAndSend(NonBlockingSocketIO nbsio,
IProgressMonitor monitor)
    throws Exception {
    // Read an integer which tells the message length.
    int len = nbsio.readUnsignedInt(monitor);
    byte[ ] buff = new byte[len];
    nbsio.readBytes(buff, len, monitor); // Read the specified bytes.
    System.out.println("Received " + len + " bytes of message: " + new
    String(buff, "cp037"));
    // Send a response.
    String clientMsg = "Hello from Client";
    ByteBuffer bb = ByteBuffer.allocate(4 + clientMsg.length( ));
    bb.putInt(clientMsg.length( ));
    bb.put(clientMsg.getBytes("cp037"));
    nbsio.writeBytes(bb.array( ), 0, 4+clientMsg.length( ), monitor);
    System.out.println("Sent a message...");
}
```

As described above in association with FIG. 1 through FIG. 4, the example systems and processes provide an abstracted authenticated client connectivity application programming interface (API). Many other variations and additional activities associated with an abstracted authenticated client connectivity application programming interface (API) are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a client-side authenticated-connection application programming interface (API) executed by a processor of a client device, a request from a client application to establish a connection to a server application executed by a server device;
   sending, on behalf of the client application, the connection request to a server-side authenticated-connection API executed by the server device that hosts the server application, where the connection request comprises user identification information usable to authenticate a user of the client application with the server-side authenticated-connection API to access the server application;
   receiving a connection establishment acknowledgement from the server-side authenticated-connection API;
   returning a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API;
   receiving, in response to sending the connection request to the server-side authenticated-connection API, an indication designated by the server-side authenticated-connection API of one of secure socket layer (SSL) communications and non-SSL communications for the requested connection; and
   initiating an SSL handshake in response to the server-side authenticated-connection API designating the SSL communications for the requested connection.

2. The method of claim 1, further comprising:
   sending, in response to a successful completion of the SSL handshake, a user identifier (ID) and a user password for authentication with the server-side authenticated-connection API, where the server-side authenticated-connection API authenticates the user with the server device; and
   where receiving the connection establishment acknowledgement from the server-side authenticated-connection API comprises receiving the connection establishment acknowledgement from the server-side authenticated-connection API in response to authentication of the user with the server device by the server-side authenticated-connection API.

3. The method of claim 1, where:
   the connection request received from the client application further comprises a server application identifier (ID) that identifies the server application; and
   sending, on behalf of the client application, the connection request to the server-side authenticated-connection API executed by the server device that hosts the server application comprises sending the received server application ID as part of the connection request to the server-side authenticated-connection API.

4. The method of claim 3, where the server-side authenticated-connection API further invokes execution of the server application on the server device as a new process under ownership of the client application used by the user in response to authentication of the user with the server device and where:
   receiving the connection establishment acknowledgement from the server-side authenticated-connection API comprises receiving an acknowledgement that the invocation of the execution of the server application on the server device by the server-side authenticated-connection API is successful.

5. The method of claim 1, where receiving, at the client-side authenticated-connection API executed by the processor of the client device, the request from the client application to establish the connection to the server application executed by the server device comprises receiving a user identifier (ID) and a user password with the connection request from the client application.

6. The method of claim 5, where the user identification information of the connection request usable to authenticate the user of the client application with the server-side authenticated-connection API to access the server application comprises the received user ID and user password.

7. A system, comprising:
   a communication interface; and
   a hardware processor programmed to:
      receive, at a client-side authenticated-connection application programming interface (API) executed by a processor of a client device, a request from a client application to establish a connection to a server application executed by a server device;
      send, on behalf of the client application via the communication interface, the connection request to a server-side authenticated-connection API executed by the server device that hosts the server application, where the connection request comprises user identification information usable to authenticate a user of the client application with the server-side authenticated-connection API to access the server application;
      receive a connection establishment acknowledgement from the server-side authenticated-connection API via the communication interface;
      return a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API;
      receive, via the communication interface in response to sending the connection request to the server-side authenticated-connection API, an indication designated by the server-side authenticated-connection API of one of secure socket layer (SSL) communications and non-SSL communications for the requested connection; and
      initiate an SSL handshake in response to the server-side authenticated-connection API designating the SSL communications for the requested connection.

8. The system of claim 7, where the processor is further programmed to:
- send, via the communication interface in response to a successful completion of the SSL handshake, a user identifier (ID) and a user password for authentication with the server-side authenticated-connection API, where the server-side authenticated-connection API authenticates the user with the server device; and
- where, in being programmed to receive the connection establishment acknowledgement from the server-side authenticated-connection API via the communication interface, the processor is programmed to receive the connection establishment acknowledgement from the server-side authenticated-connection API in response to authentication of the user with the server device by the server-side authenticated-connection API.

9. The system of claim 7, where:
- the connection request received from the client application further comprises a server application identifier (ID) that identifies the server application; and
- in being programmed to send, on behalf of the client application via the communication interface, the connection request to the server-side authenticated-connection API executed by the server device that hosts the server application, the processor is programmed to send the received server application ID as part of the connection request to the server-side authenticated-connection API.

10. The system of claim 9, where the server-side authenticated-connection API further invokes execution of the server application on the server device as a new process under ownership of the client application used by the user in response to authentication of the user with the server device and where:
- in being programmed to receive the connection establishment acknowledgement from the server-side authenticated-connection API via the communication interface, the processor is programmed to receive an acknowledgement that the invocation of the execution of the server application on the server device by the server-side authenticated-connection API is successful.

11. The system of claim 7, where:
- in being programmed to receive, at the client-side authenticated-connection API executed by the processor of the client device, the request from the client application to establish the connection to the server application executed by the server device, the processor is programmed to receive a user identifier (ID) and a user password with the connection request from the client application; and
- the user identification information of the connection request usable to authenticate the user of the client application with the server-side authenticated-connection API to access the server application comprises the received user ID and user password.

12. A computer program product, comprising:
- a computer readable storage medium having computer readable program code embodied therewith, where the computer readable program code when executed on a computer causes the computer to:
- receive, at a client-side authenticated-connection application programming interface (API) executed by a processor of a client device, a request from a client application to establish a connection to a server application executed by a server device;
- send, on behalf of the client application, the connection request to a server-side authenticated-connection API executed by the server device that hosts the server application, where the connection request comprises user identification information usable to authenticate a user of the client application with the server-side authenticated-connection API to access the server application;
- receive a connection establishment acknowledgement from the server-side authenticated-connection API;
- return a handler to the client application that represents an established connection to the server application executed by the server device as the connection establishment acknowledgement and as an indication that communication with the server application using the handler over the established connection via a separate application-specific read/write API is available, where the client application is configured to communicate with the server application using the handler over the established connection via the separate application-specific read/write API;
- receive, in response to sending the connection request to the server-side authenticated-connection API, an indication designated by the server-side authenticated-connection API of one of secure socket layer (SSL) communications and non-SSL communications for the requested connection; and
- initiate an SSL handshake in response to the server-side authenticated-connection API designating the SSL communications for the requested connection.

13. The computer program product of claim 12, where the computer readable program code when executed on the computer further causes the computer to:
- send, in response to a successful completion of the SSL handshake, a user identifier (ID) and a user password for authentication with the server-side authenticated-connection API, where the server-side authenticated-connection API authenticates the user with the server device; and
- where, in causing the computer to receive the connection establishment acknowledgement from the server-side authenticated-connection API, the computer readable program code when executed on the computer causes the computer to receive the connection establishment acknowledgement from the server-side authenticated-connection API in response to authentication of the user with the server device by the server-side authenticated-connection API.

14. The computer program product of claim 12, where:
- the connection request received from the client application further comprises a server application identifier (ID) that identifies the server application; and
- in causing the computer to send, on behalf of the client application, the connection request to the server-side authenticated-connection API executed by the server device that hosts the server application, the computer readable program code when executed on the computer causes the computer to send the received server application ID as part of the connection request to the server-side authenticated-connection API.

15. The computer program product of claim 14, where the server-side authenticated-connection API further invokes execution of the server application on the server device as a new process under ownership of the client application used by the user in response to authentication of the user with the server device and where:
- in causing the computer to receive the connection establishment acknowledgement from the server-side authenticated-connection API, the computer readable program code when executed on the computer causes the computer to receive an acknowledgement that the invocation of the execution of the server application on the server device by the server-side authenticated-connection API is successful.

16. The computer program product of claim 12, where, in causing the computer to receive, at the client-side authenticated-connection API executed by the processor of the client device, the request from the client application to establish the connection to the server application executed by the server device, the computer readable program code when executed on the computer causes the computer to receive a user identifier (ID) and a user password with the connection request from the client application.

17. The computer program product of claim 16, where the user identification information of the connection request usable to authenticate the user of the client application with the server-side authenticated-connection API to access the server application comprises the received user ID and user password.

* * * * *